US006681897B2

United States Patent
Gibson et al.

(10) Patent No.: US 6,681,897 B2
(45) Date of Patent: Jan. 27, 2004

(54) APPARATUS FOR SUPPORTING AUTOMOTIVE TIRES

(75) Inventors: Anthony C. Gibson, Alta Loma, CA (US); Roy Starling, Union City, CA (US); Martin Roden, Long Beach, CA (US)

(73) Assignee: Tire Hanger Corporation, Rancho Cucamonga, CA (US)

( * ) Notice: Subject to any disclaimer, the term of this patent is extended or adjusted under 35 U.S.C. 154(b) by 0 days.

(21) Appl. No.: 10/313,055

(22) Filed: Dec. 6, 2002

(65) Prior Publication Data

US 2003/0080270 A1 May 1, 2003

Related U.S. Application Data

(62) Division of application No. 10/012,780, filed on Nov. 6, 2001, now Pat. No. 6,604,610, which is a division of application No. 09/271,115, filed on Mar. 17, 1999, now abandoned.

(51) Int. Cl.[7] .......................... B66F 7/00; B60B 30/02; B60B 30/08
(52) U.S. Cl. ..................... 187/203; 187/216; 254/89 R; 414/426; 269/52
(58) Field of Search .......................... 248/228.5, 228.6, 248/229.14, 229.15, 229.24, 229.25, 231.71, 282.1, 288.11, 289.11, 290.1, 292.13, 294.1; 187/216, 217, 218, 219, 220, 203, 204, 207; D34/33, 35; 254/89 R, 90; 414/426, 427; 269/47, 52; 211/20, 23, 24; 224/42.12, 42.21, 42.24, 42.26, 42.28, 42.3

(56) References Cited

U.S. PATENT DOCUMENTS

| 864,983 A | 9/1907 | McKinney |
| 2,175,421 A | 10/1939 | Wright ........................ 248/290 |
| 2,674,394 A | 4/1954 | Hall et al. ................ 224/42.24 |
| 3,830,387 A | 8/1974 | Virnig ........................ 214/331 |
| 3,843,033 A | 10/1974 | Wirth, Sr. ................ 224/42.24 |
| 3,883,018 A | 5/1975 | Hoisington .................. 215/454 |
| 4,042,139 A | 8/1977 | Pernsteiner et al. ........ 214/331 |
| 4,089,449 A | 5/1978 | Bayne et al. ............. 224/42.24 |
| 4,111,344 A | 9/1978 | MacDonald ............. 224/42.24 |
| 4,153,188 A | 5/1979 | Seymour .................. 224/42.24 |
| 4,410,117 A | 10/1983 | Crawford et al. ......... 224/42.06 |
| 4,457,401 A | 7/1984 | Taylor et al. .............. 187/8.49 |
| 4,650,144 A | 3/1987 | Conrad ........................ 248/290 |
| 4,684,310 A | 8/1987 | Stange ........................ 414/427 |
| 4,751,833 A | 6/1988 | Stumpf, Jr. .................. 70/259 |
| 4,776,569 A | 10/1988 | Nestel-Eichhausen ........ 254/89 |
| 4,976,336 A | 12/1990 | Curran ........................ 187/8.5 |
| 5,007,789 A | 4/1991 | Painter ........................ 414/427 |
| 5,078,276 A | 1/1992 | Rogge et al. .................. 211/18 |
| 5,146,808 A | 9/1992 | Hoshino ...................... 74/531 |
| 5,180,141 A | 1/1993 | Hunt .......................... 254/131 |
| 5,257,446 A | 11/1993 | Steves, Jr. et al. ........ 29/402.08 |
| 5,464,314 A | 11/1995 | Laaksonen .................. 414/427 |
| 5,542,631 A | 8/1996 | Bruno .......................... 248/58 |
| 5,618,228 A | 4/1997 | Anderson .................... 451/403 |
| 5,649,582 A | 7/1997 | Hjorth-Hansen ............. 157/19 |
| 5,727,656 A | 3/1998 | Gaudioso et al. ........... 187/221 |
| 5,803,206 A | 9/1998 | Halstead et al. ............ 187/208 |
| 5,887,461 A | 3/1999 | Heffley .......................... 70/18 |
| 5,954,160 A | 9/1999 | Wells, Sr. et al. .......... 187/219 |

Primary Examiner—Ramon O. Ramirez
Assistant Examiner—Jon Szumny
(74) Attorney, Agent, or Firm—Rutan & Tucker, LLP

(57) ABSTRACT

An apparatus for supporting automotive tires having a hanger pin adapted to fit through the mount hole of a vehicle wheel. The apparatus is intended to be installed on an automotive hoist at a height approximately the same as that of a tire of a vehicle disposed on the hoist. A worker removing a wheel from the vehicle disposed on the hoist can thus hang the wheel on the apparatus without significantly bending at the waist.

5 Claims, 8 Drawing Sheets

APPARATUS FOR SUPPORTING AUTOMOTIVE TIRES

This Appln is a Div of Ser. No. 10/012,780 filed Nov. 6, 2001 U.S. Pat. No. 6,604,610 which is a Div of Ser. No. 09/271,115 filed Mar. 17, 1999 ABN.

BACKGROUND OF INVENTION

1. Field of the Invention

The present invention relates to an apparatus for handling vehicle wheels and more particularly to an apparatus for supporting vehicle wheels that have been temporarily removed from a vehicle disposed on a lift or hoist.

2. Description of the Related Art

Automotive maintenance and repair is often made more convenient by lifting the automobile on a hydraulic or electric lift or hoist, thereby providing easy access to the vehicle's undercarriage. This access may be enhanced by temporarily removing the vehicle's wheels. Also, some automotive maintenance (i.e., tire rotation or brake maintenance) requires removal of the wheels. However, the tire/wheel assemblies tend to be very heavy. A single tire/wheel assembly can weigh 40–45 pounds for a car, and 65–70 pounds for a truck.

When a wheel is temporarily removed from a vehicle elevated on a hoist, the individual removing that wheel must temporarily dispose of it in some way. Typically, the individual bends over and places the wheel on the floor. Later, the individual must similarly bend to lift the wheel off the floor for reinstallation on the vehicle. Individuals engaged in this type of repeated lifting procedure may sustain pain and/or injuries due to back strain, muscle strain and the like. To avoid possible injury, individuals removing such tires have sometimes been known to carry the tire out of the work area to a table or other surface on which the tire can be placed temporarily without requiring the individual to bend over. Such transportation of the tire away from the work area results in wasted time and effort. Also, carrying the heavy tire/wheel assembly speeds worker fatigue.

Various devices have been proposed to assist individuals in handling tire/wheel assemblies when mounting and removing them from vehicles disposed on hoists. These devices include various types of lifts, carts and dollies for lifting and handling the tires. Although they may help workers to remove and support tires from a vehicle elevated on a lift, these devices can cause problems of their own, such as cluttering up the work space and being quite expensive to purchase and maintain. Also, these lifts, carts and dollies may be complicated to use.

SUMMARY OF INVENTION

Accordingly, it is a principal object and advantage of the present invention to overcome some or all of these limitations and to provide an improved tire support apparatus that is inexpensive, is easily accessible within the work space, is small and will remain out of the way, and will not require workers to bend over to temporarily dispose of a vehicle tire.

In accordance with one embodiment, the present invention provides a tire support apparatus having a front plate mounted onto a vertical support of a vehicle hoist. A support bracket attached to the front plate holds a support arm. Once a vehicle has been elevated on the hoist, a worker removes a tire/wheel assembly, carries it to the tire support apparatus, and hangs the tire on the support arm. Thus, the worker does not have to bend over to temporarily dispose of the tire and the tire hangs out of the way until the worker is ready to reinstall it onto the vehicle. Since the tire support apparatus fits onto the vertical support of the hoist, it does not clutter up the garage work space. Also, the elegantly simple design of the apparatus allows for inexpensive manufacture and easy use.

In accordance with another embodiment, the present invention provides a tire support apparatus having a pair of mount plates pulled toward each other by fasteners operating between the plates. The pair of mount plates is used to secure the tire support apparatus to an automotive hoist. The plates are disposed on opposing surfaces of a hoist member and the bolts operating between the plates pull the plates towards each other to, in effect, squeeze the hoist member and secure the apparatus thereon. A pivot pin extends between the mount plates and a support arm is pivotable about the pivot pin and has a hanger extending therefrom. In a variation of this embodiment, the support arm is pivotable between open and closed positions. The closed position corresponds to a condition in which the support arm is pushed out of the way and the open position corresponds to the condition in which the support arm extends from the hoist and can receive a tire on its hanger. Optionally, a spring and ball detent mechanism is installed into the support arm and holes corresponding to the open and closed positions are drilled into the second mount plate. In this manner, the spring and ball detent mechanism releasably secures the support arm in the open and closed positions.

In accordance with another embodiment, the present invention provides a tire support apparatus with a hanger tool disposed on a mount body. The mount body is disposed on an automotive hoist so that the mount body is at about the same height as a tire of a vehicle elevated on the hoist. Thus, a worker removing the tire from the vehicle on the hoist can temporarily hang the tire on the hanger tool without bending significantly at the waist.

In accordance with another embodiment, the present invention provides a method for temporary disposal of an automotive tire/wheel assembly including the steps of elevating a vehicle on the hoist; removing a tire/wheel assembly from the vehicle; and placing the wheel on a support arm installed on the hoist.

In accordance with another embodiment, the present invention provides an automotive hoist having means for supporting a tire/wheel assembly and means for mounting the supporting means to the hoist.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular, preferred embodiment(s) disclosed.

DETAILED DESCRIPTION OF THE PREFERRED EMBODIMENT

The tire support apparatus of the present invention can be combined with a conventional electric or hydraulic lift or other suitable lift or hoist which supports a vehicle in an elevated position, as is conventional practice when servicing various components of a vehicle.

Figure 1:
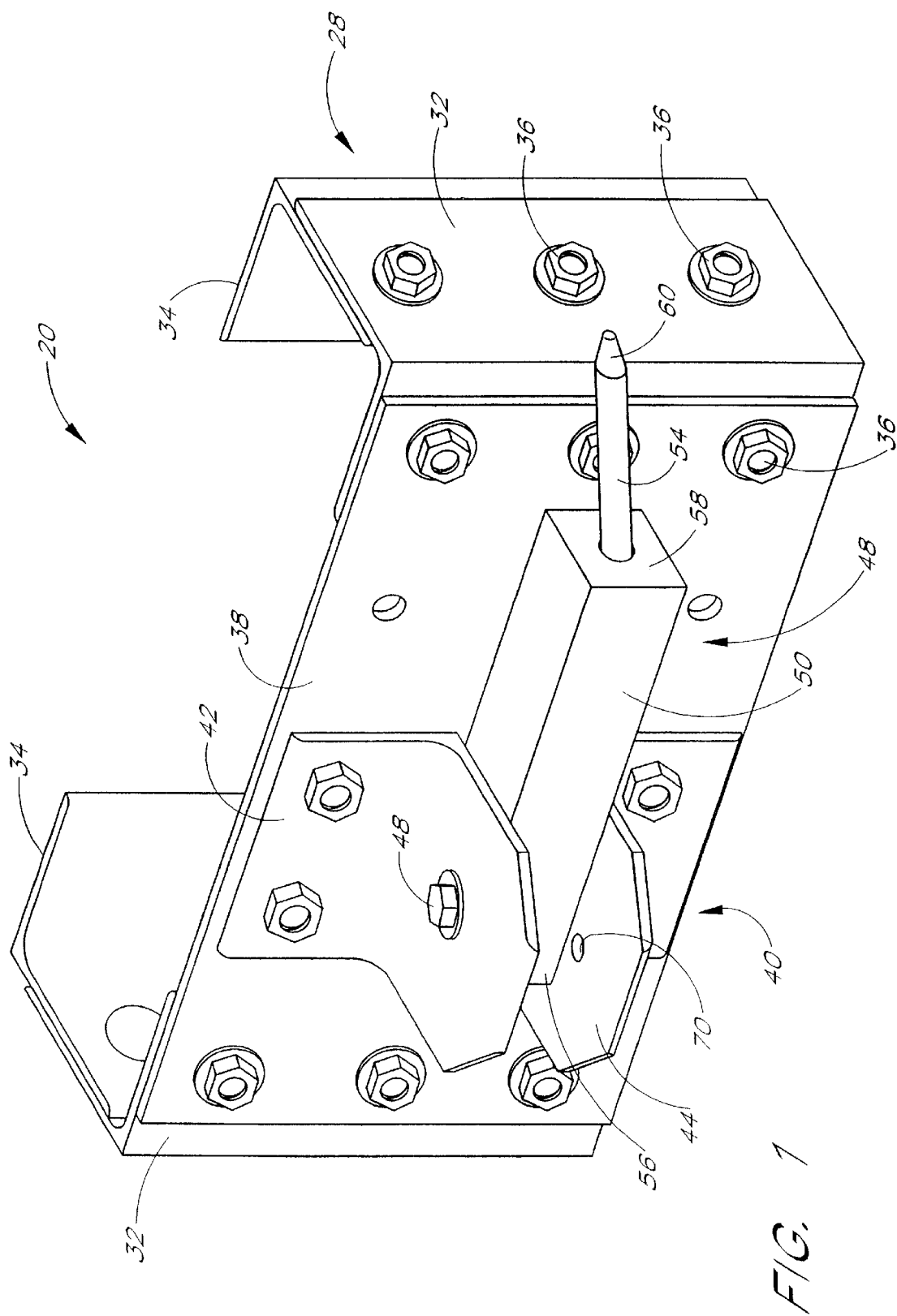
FIG. 1 is a perspective view illustrating one embodiment of a tire support apparatus having features and advantages in accordance with the present invention.
Figure 2:
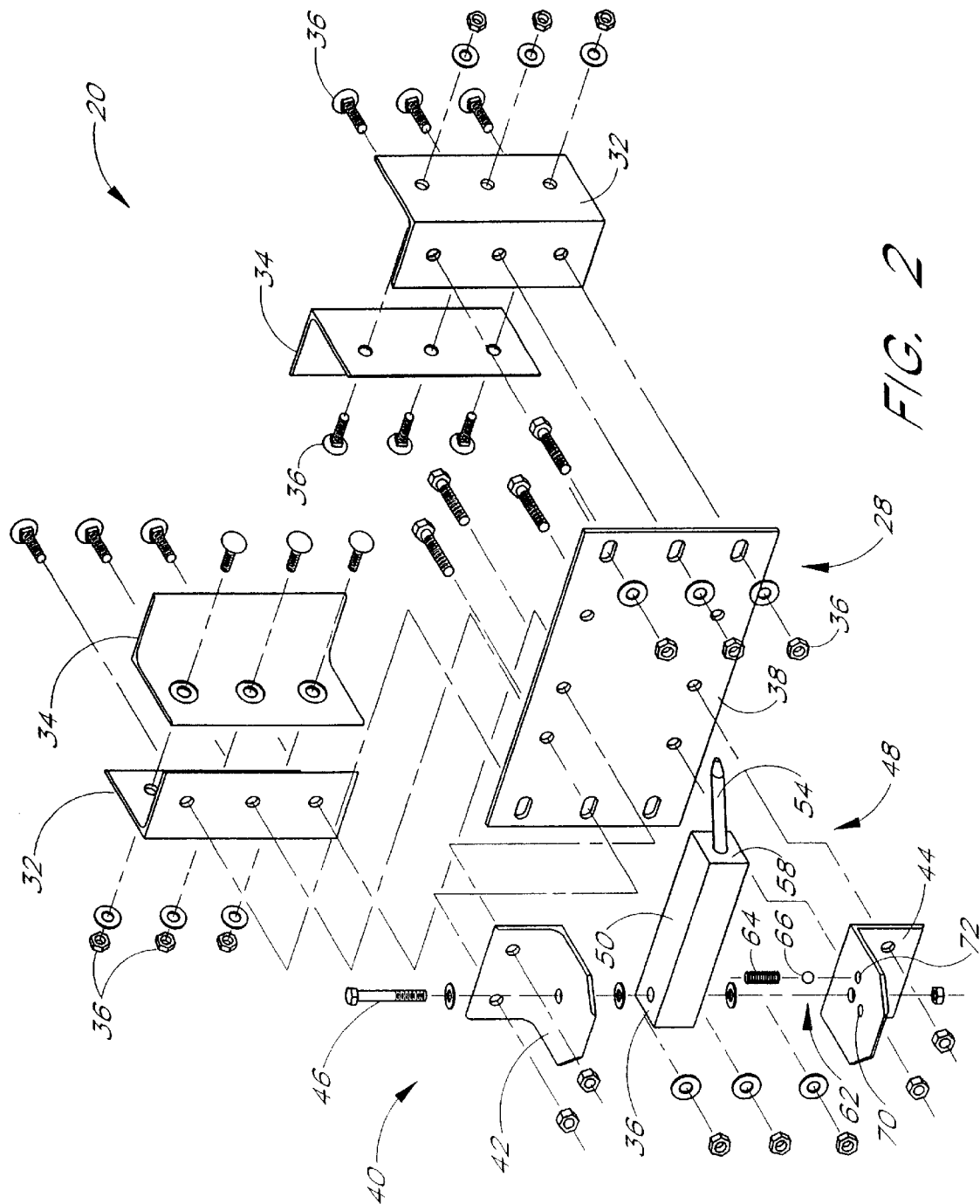
FIG. 2 is an exploded view of the tire support apparatus of FIG. 1.
Figure 5:
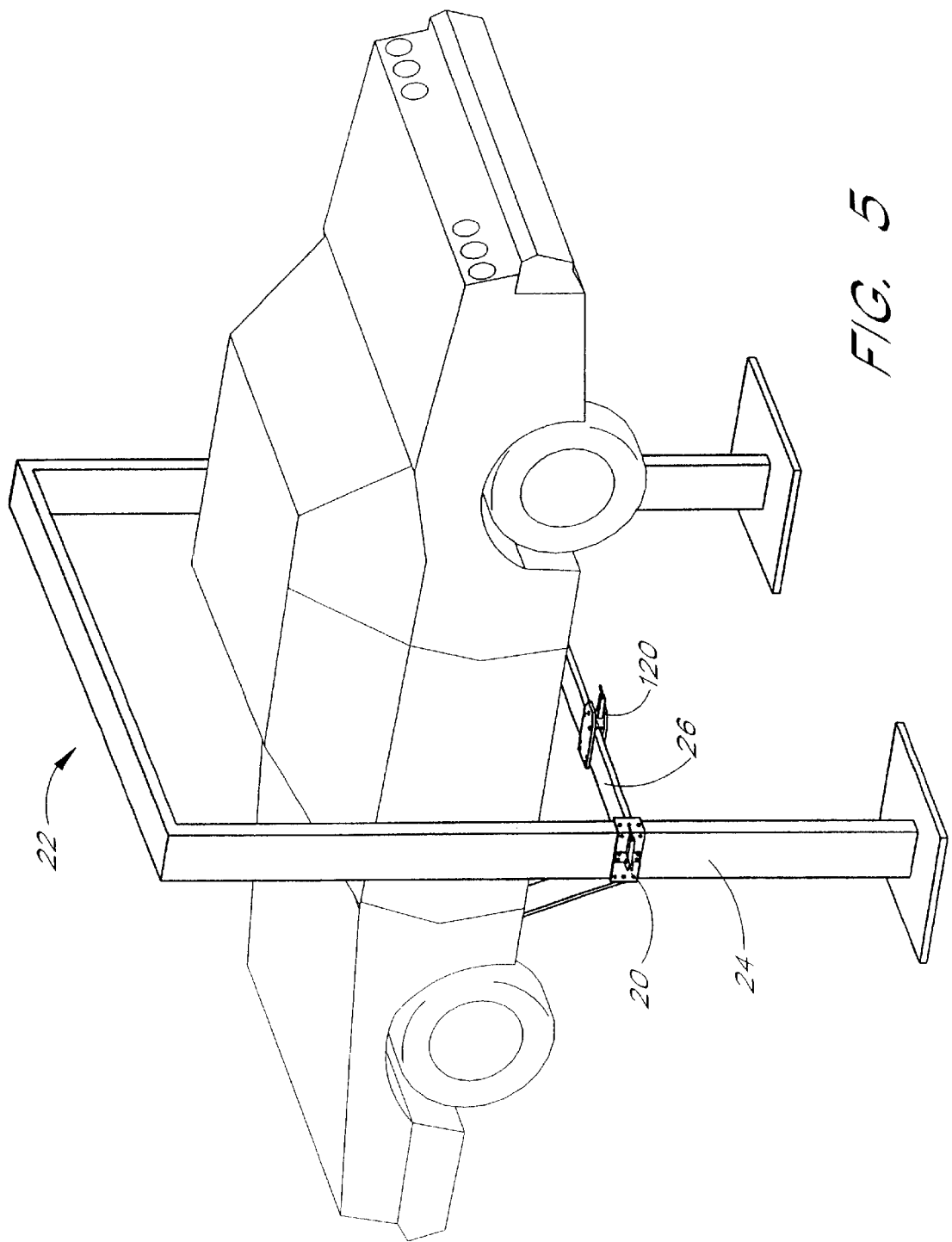
FIG. 5 is a perspective view showing an electric lift and the devices of FIGS. 1 and 4 disposed on the lift.
Figure 6:
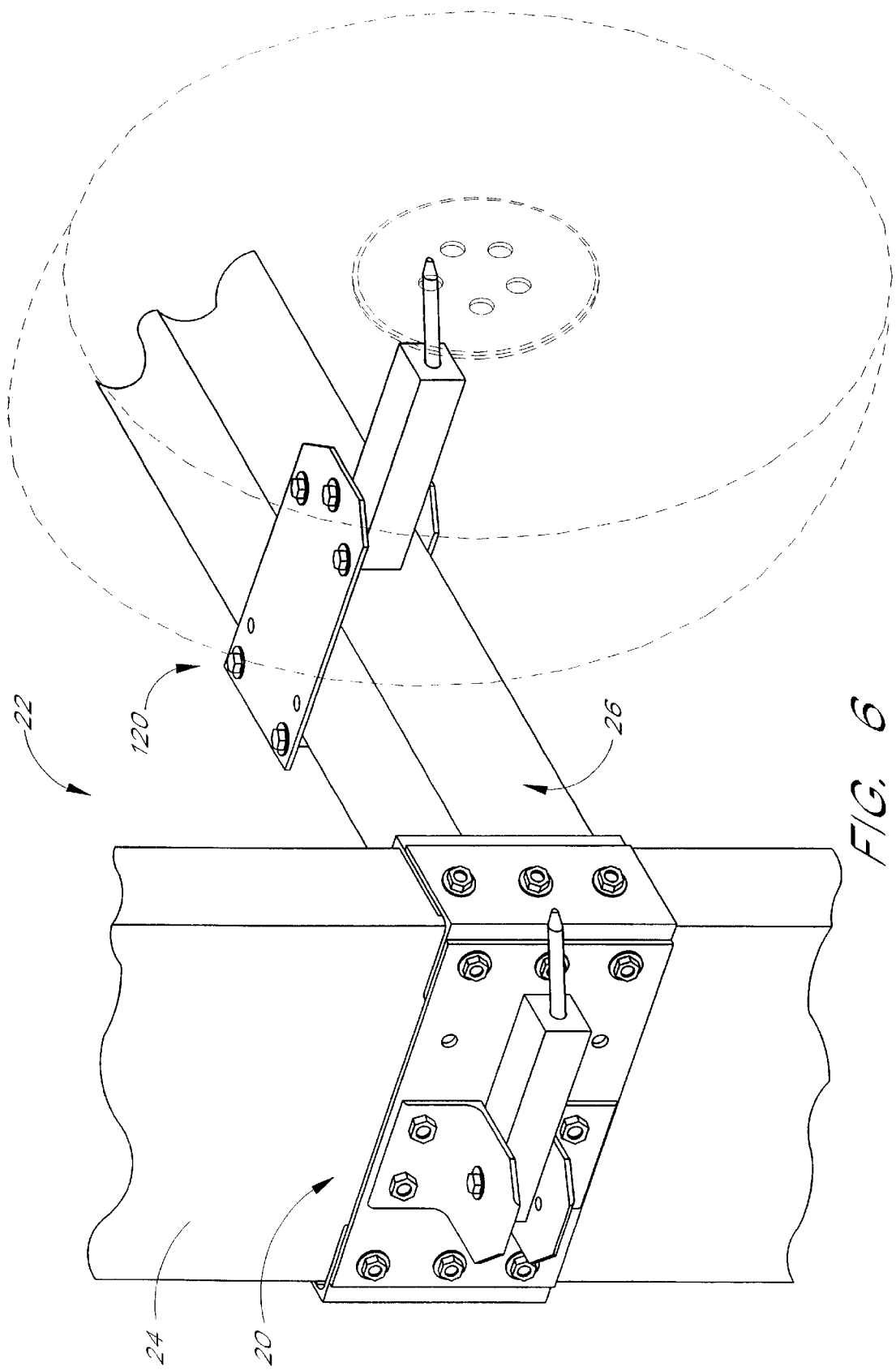
FIG. 6 is a close up cutaway view of the lift of FIG. 5 showing the devices of FIGS. 1 and 4 in more detail.

FIGS. 1–3, 5 and 6 illustrate an embodiment of a tire support apparatus 20 having features of the present invention. FIGS. 5 and 6 show the tire support apparatus 20 installed on a vertical support member 24 of an electric lift 22. Referring to FIGS. 1 and 2, a mount body 28 is provided comprising a set of L-brackets 32, 34, a front plate 38, and a support bracket 40 which are secured onto the vertical member 24 of the lift 22 (see FIGS. 5 and 6). Side and back L-brackets, 32, 34 grasp the lift member 24. Fasteners 36 such as bolts and nuts secure the L-brackets 32, 34 tightly together around the hoist member 24. The front plate 38 is fastened to the L-brackets 32, 34. The support bracket 40 is disposed on the front plate 38, has top and bottom members 42, 44, and a pivot pin or bolt 46 extending between the top and bottom members 42, 44.

A support body 48 comprising a support arm 50 and a hanger pin or spindle 54 is held by the mount body 28. The support arm 50 is disposed between the top and bottom members 42, 44 of the support bracket 40. The pivot pin 46 extends through the support arm 50 near a first end 56 of the arm 50, allowing the arm 50 to pivot about the pivot pin 46. The hanger pin or spindle 54 is about 3–10 inches long and extends from a second end 58 of the support arm 50 in a direction slightly upward from a horizontal plane. The pin or spindle 54 is preferably coned or rounded at its distal end 60 to facilitate easy insertion through a mount hole of a tire/wheel assembly, although this feature is not central to practicing the invention.

Figure 3:
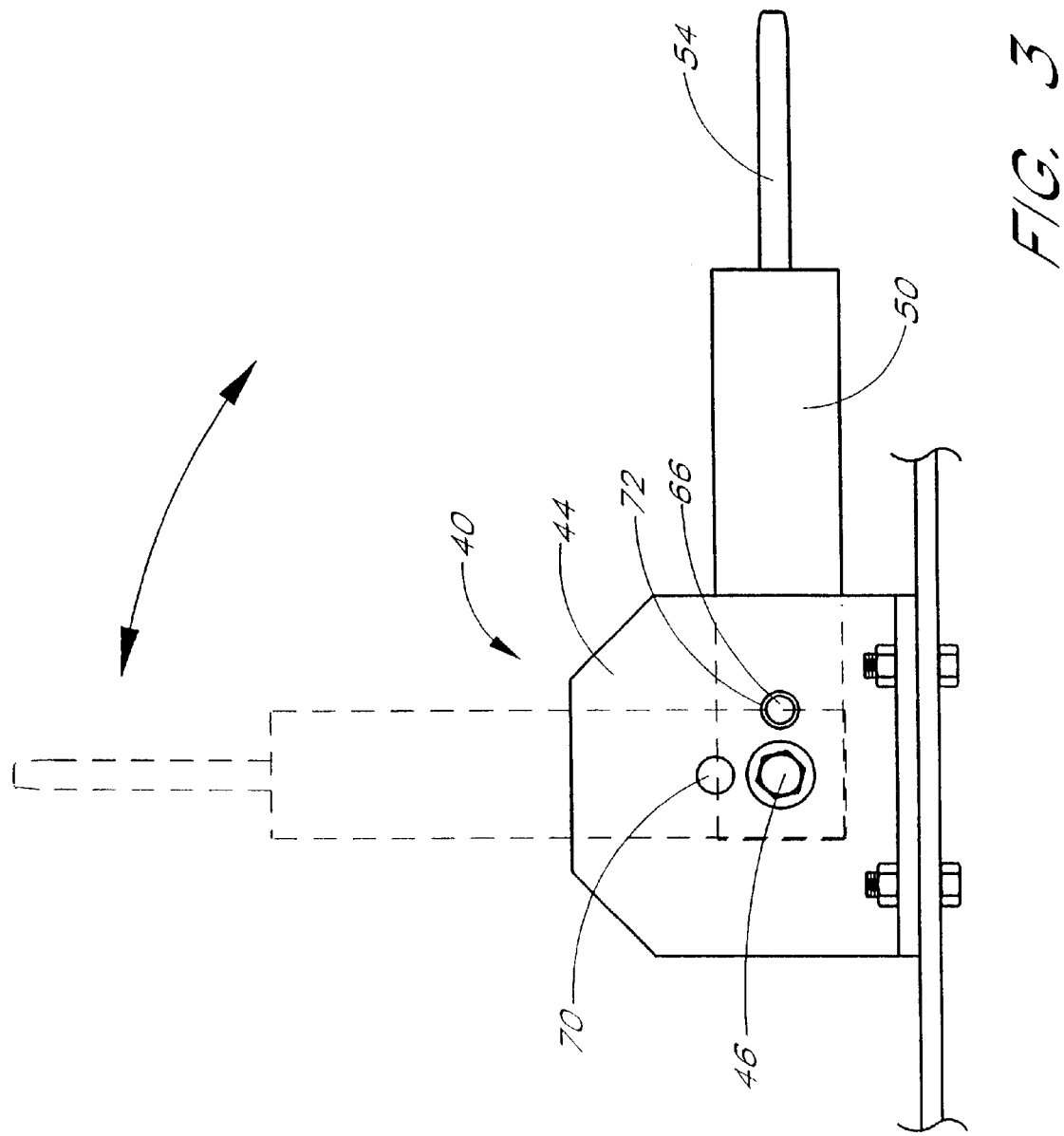
FIG. 3 is a bottom view of a portion of the tire support apparatus of FIG. 1 showing the support bracket, detent mechanism and the swivel movement of the support arm.

FIG. 3 shows the swivel action of the support arm 50 about the substantially vertical pivot pin 46. Dark lines depict the support arm 50 disposed in what is referred to as a closed position; shadow lines show the support arm 50 disposed in what is referred to as an open position. A detent mechanism 62 is optionally provided to retain the support arm in either the open or closed positions. The detent mechanism 62 includes a spring 64 and ball 66, as shown in FIG. 2, disposed within a cavity formed in the support arm 50. Holes 70, 72 are formed in the bottom member 44 of the support bracket 40 in positions corresponding to the open and closed positions, respectively, of the support arm 50. The holes 70, 72 are sized so that the ball 66 cannot pass completely therethrough. As the support arm 50 is swiveled about the pivot pin 46, the spring 64 is compressed, pushing the ball 66 against the bottom member 44 of the support bracket 40. When the ball 66 and spring 64 reach a hole, the spring 64 forces the ball 66 partially into the hole. The resulting resistance discourages further swiveling of the support arm 50. This resistance can be overcome by application of moderate lateral force.

The tire support apparatus 20 is preferably mounted on the vertical support member 24 of a lift or hoist 22 at a height roughly corresponding to the height of a vehicle wheel's mounting holes when the vehicle is elevated on the hoist 22. Typically, a vehicle disposed on a lift or hoist 22 is elevated to about chest high or above relative to a worker. Thus, it is anticipated that the preferred height will be about chest high to the average worker. However, worker heights vary and workers have individual preferences as to how high the vehicle is lifted. Some may prefer the vehicle to be about chest high or lower; however, some may prefer the vehicle to be lifted completely overhead. Thus, it is anticipated that the preferred mounting height will be between about three feet to seven feet above the floor. Since it is anticipated that the typical worker will raise the vehicle to about chest high, the most likely range of preferred installation height is between about four to five and one half feet from the floor.

To use the tire support apparatus 20, a vehicle is first elevated into place by the hoist 22. A worker then pivots the support arm 50 of the tire support apparatus 20 to the open position. A tire/wheel assembly is removed from the vehicle and held in the worker's arms. The worker steps over to the tire support apparatus 20 and guides a mounting hole of the tire/wheel assembly over the hanger pin 54 of the tire support apparatus 20. The worker then releases the tire/wheel assembly, letting it hang. When the maintenance or repair work on the vehicle is complete, the worker grasps the tire/wheel assembly and pulls it clear of the hanger pin 54. After reinstalling the wheel onto the vehicle, the worker pushes the support arm 50 to the closed position. Thus, the tire support apparatus 20 is conveniently accessible when in use but does not get in the way when not in use. Also, back strain is avoided because the worker does not have to bend over while holding a heavy tire; time is saved because the worker does not have to walk far to dispose of the tire on a table; and workplace clutter is avoided because the device is out of the way when not in use.

Although the above discussed embodiment is a preferred embodiment of this invention, it is a prototype intended to test the concept of having a tire support disposed on an automotive hoist. It is anticipated that other models and embodiments will be developed using this concept of temporarily storing a tire on a support extending from a hoist. Other such embodiments are discussed below.

The L-brackets 32, 34, front plate 38 and support bracket 40 of the embodiment described above and illustrated in FIGS. 1–3 collectively function as a hanger support apparatus or mount body 28 for supporting the support arm 50 and spindle or pin 54 or another type of support body 48 when the tire/wheel assembly is rested thereon. The mount body 28 also secures the support body 48 in its place relative to the hoist 22. Those skilled in the art will appreciate that a number of constructions may be used for this mount body 28, some of which are discussed below as other embodiments of the invention. Such embodiments of the mount body may involve multiple-piece construction, single-piece construction or may comprise other means, such as a weld or bolts, for securing a support body to the hoist 22. Similarly, alternative embodiments of the hanger body or support body are discussed below.

Figure 4:
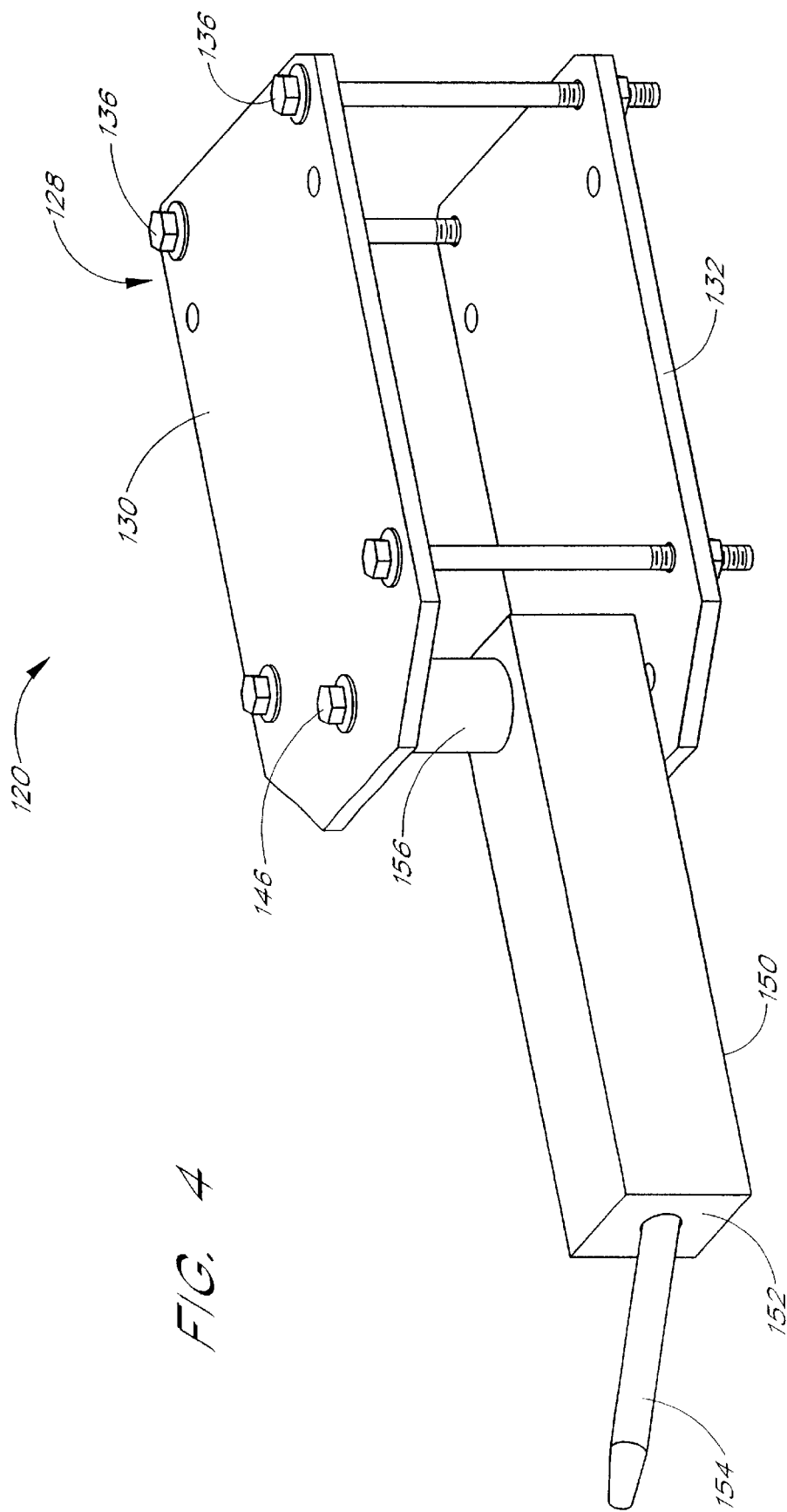
FIG. 4 is a perspective view illustrating another embodiment of a tire support bracket having features and advantages in accordance with the present invention.

FIG. 4 is a perspective view of another embodiment of a tire support bracket 120 having features of the present invention. The tire support bracket 120 is preferably mounted on a horizontal support member or lift arm 26 of an electric or hydraulic hoist 22, as shown in FIGS. 5 and 6. The tire support bracket 120 comprises a mount body 128 having top and bottom mount plates 130, 132 which, when installed on a hoist 22, are disposed on opposite sides of the horizontal lift arm 26. Bolts 136 operate between the top and bottom mount plates 130, 132 to pull the plates together about the lift arm 26. A pivot pin or bolt 146 is disposed between the plates 130, 132 and a support arm 150 is disposed thereon. The support arm 150 swivels or pivots in a substantially horizontal plane about the substantially vertical pivot pin or bolt 146. A spacer 156 on the pivot pin 148 may be provided, as needed, to accommodate the difference in thickness between the lift arm 26 and the tire support arm 150. The proximal end 152 of the support arm has a hanger pin or spindle 154 disposed thereon. A detent mechanism is preferably provided to releasably hold the support arm 150 in either an open or closed position. In use, this embodiment operates in a manner similar to the tire support apparatus 20 shown in FIG. 1 and discussed above. However, the mount body 128 of this tire support bracket 120 enables it to be mounted differently than the above embodiment.

For illustrative purposes, both a tire support apparatus 20 and a tire support bracket 120 are depicted in FIGS. 5 and 6 disposed on a single hoist 22. These Figures are intended to show possible positions of these embodiments on the hoist 22, but are not meant to imply that both embodiments must be disposed together, as shown. In practice, such embodiments of the present invention may be disposed on the vertical member 24 of the hoist 22 only, on the horizontal member 26 only, on both, or combined in any useful manner.

Figure 7:
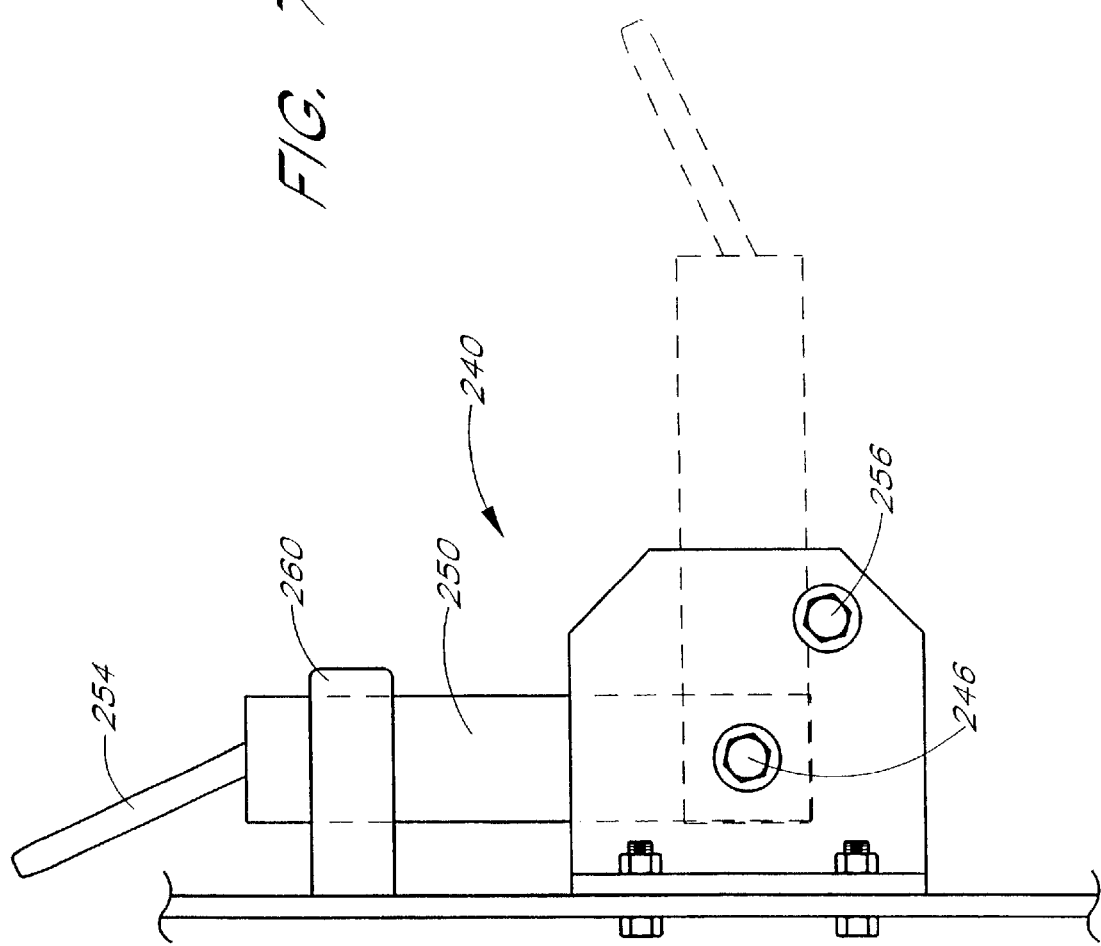
FIG. 7 is a side view of another embodiment of a support bracket having features and advantages in accordance with the present invention.

Those skilled in the art will appreciate that a number of further embodiments having features of the present invention can be created using the same principle as the above-described embodiments. For instance, FIG. 7 illustrates another embodiment of a support bracket 240 having features of the present invention. The support bracket 240 comprises left and right members. A pivot pin or bolt 246 extends generally horizontally between the members. A support arm 250 is disposed on the support bracket 240, has a hanger pin or spindle 254 extending therefrom, and pivots within a substantially vertical plane about the pivot pin 246. The closed position of the support arm 250, shown in dark lines, is generally vertical; the open position is generally horizontal. A support rod 256 is preferably disposed on the support bracket 240 so that the support arm 250 rests upon the support rod 256 when in an open position. The support rod 256 prevents the support arm 250 from pivoting below a horizontal plane or other predetermined position. A clip 260 accepts the support arm 250 and releasably holds it in the vertical closed position.

The spindle or pin 54, 154, 254 extending from the support arm 50, 150, 250 of the tire support apparatus 20, 120 or support bracket 240 can be of various lengths, depending on the number of tire/wheel assemblies intended to be hung thereon. An embodiment intended to hold a single tire/wheel assembly will have a hanger pin 54, 154, 254 of about 3 to 5 inches in length. However, a pin 54, 154, 254 intended to hold two or more such wheels may be about 10 inches or more in length. Preferably, a hole (not shown) is drilled into the support arm 50, 150, 250 into which the pin 54, 154, 254 is inserted. A weld preferably secures the pin 54, 154, 254 in place, although the hole and pin 54, 154, 254 may be threaded to facilitate a threaded connection. Alternatively, the pin 54, 154, 254 can be secured to the end of the support arm 50, 150, 250 by a weld alone. The pin 54, 154, 254 may also be retractable within the support arm 50, 150, 250 if desired.

Figure 8:
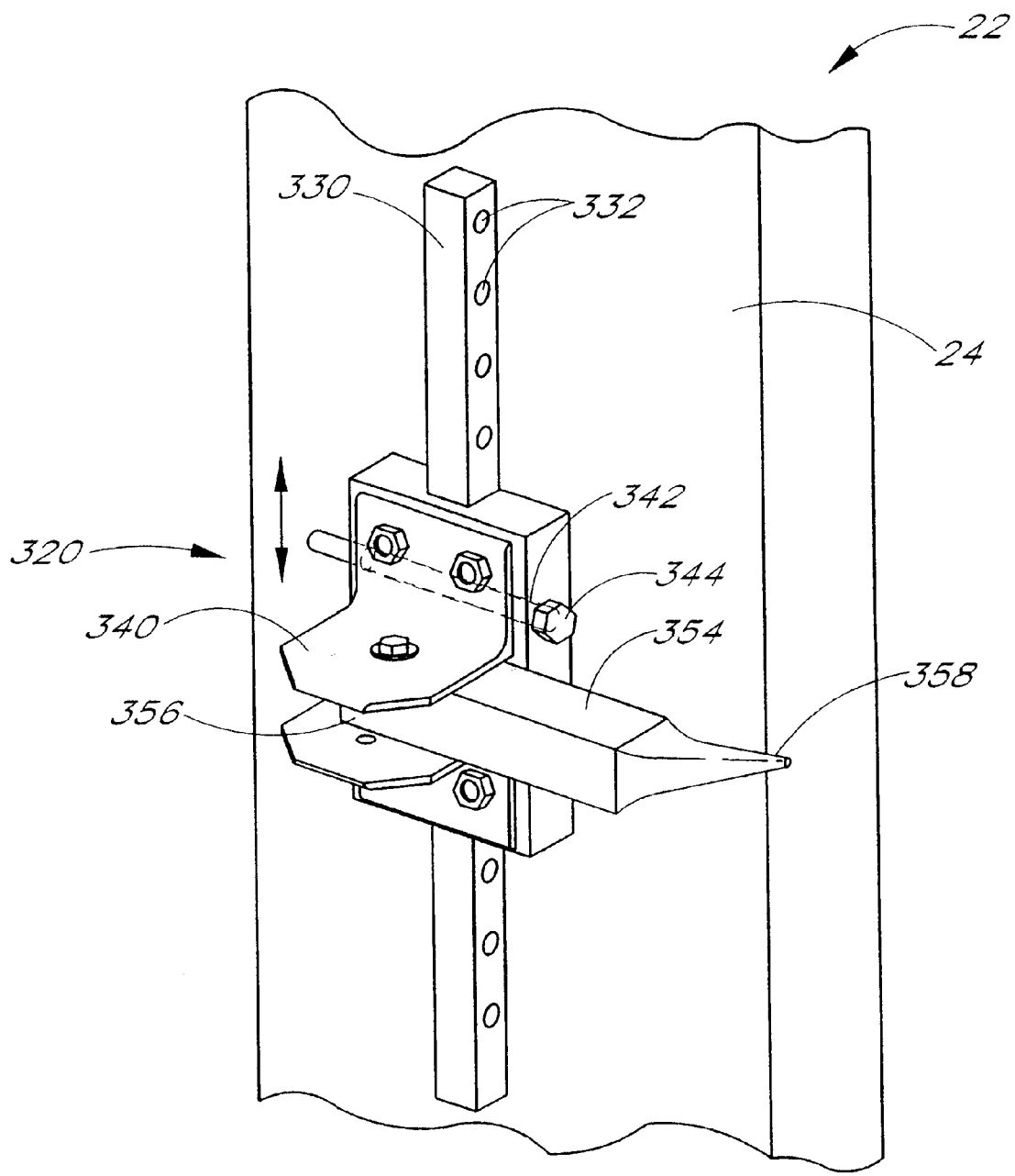
FIG. 8 is a perspective view of another embodiment of a tire support apparatus having features and advantages in accordance with the present invention.

Those skilled in the art will appreciate that the support arm 50, 150, 250 and pin 54, 154, 254 may be formed of a single piece of material. As shown in FIG. 8, an embodiment of a hanger arm 354 having features of the present invention is shaped such that a first end 356 communicates with the support bracket 340 and a second end 358 is sized and adapted to fit through a mount hole of the vehicle wheel.

Those skilled in the art will also appreciate that the spindle or pin 54 provides a support body to hang or rest a tire/wheel assembly thereon. Various other methods and types of hangers and support bodies may be suitably employed, such as, for example, a spike, hook, clasp, bolt, peg, dowel, bar or an arcuate member adapted to fit the inside rim of the tire/wheel assembly.

A number of other structures may be used to employ the principle of supporting the tire/wheel assembly. For instance, in one embodiment having features of the present invention, the support body 48 may comprise an arcuate cradle (not shown) extending from the mount body 28 of the tire support apparatus 20. The cradle is adapted to receive a tire therein and enables a worker to rest the tire in the cradle. Yet another embodiment of a tire support may include a plurality of arms extending from the tire support apparatus, which arms are adapted to cradle a tire/wheel assembly therein.

In a still further embodiment, an arm extending from the hoist 22 holds a cradle just below a still-installed tire of a vehicle disposed on the hoist. The cradle is adapted to receive and hold a tire therein. When the tire is removed from the vehicle, it rests in the cradle without having to be lifted into place. The cradle and arm are then swung, telescoped or otherwise pushed out of the way to enable maintenance of the vehicle. To reinstall the tire, the cradle is brought into a position so that the tire is reinstallable onto the vehicle without having to be lifted into place.

A tire support apparatus 20 for use on a vertical hoist member 24 can also be adapted to be adjustable in height, if desired. To accomplish this, the tire support apparatus 20 of FIG. 1 is adjusted so that the L-brackets 32, 34 do not fit tightly about the support member 24. The tire support apparatus 20 may then be moved vertically by any suitable means, such as a chain, wire, rope, gears, pulleys or by hand, and held in place by set screws, bolts, brackets or pins disposed in the front plate 38 of the tire support apparatus 20.

FIG. 8 shows yet another embodiment having features of the present invention. A tire support apparatus 320 of adjustable height is provided for use on a vertical hoist member 24. A bar 330 is welded or otherwise secured on the hoist member 24 in a generally vertical orientation. The bar 330 has generally horizontal holes 332 extending therethrough. A support bracket 340 is slidably disposed on the vertical bar 330. Holes 342 are formed in the bracket 340, through which a lock pin 344 can be inserted. The lock pin 344 extends through both the bracket hole 342 and a bar hole 332 to hold the bracket 340 in place on the bar 330. A support arm or hanger 354 is held by the support bracket 340.

Those skilled in the art will appreciate that, in addition to a pivot pin, alternative means may enable a support arm to swivel between the open and closed positions. Such optional structures include, for example, a hinge, bearing, swivel or axle.

Those skilled in the art will appreciate that a number of methods may be used to secure a tire support apparatus 20 to a hoist 22. For example, the tire support bracket 120 of FIG. 4 is secured to a horizontal hoist member 26 by bolts pulling opposing plates 130, 132 together. A variation of this method can be used to secure a tire support apparatus 20 to a vertical hoist member 24. Also, holes may be drilled through the vertical 24 or horizontal 26 hoist members to facilitate securing a mount body, such as a support bracket, directly to the hoist 22 by screws or bolts.

In another embodiment having features of the present invention, the tire support apparatus 20 of FIG. 1 may be altered so that the front plate 38 is welded or otherwise secured onto a hoist member. The support bracket 40 remains bolted or welded onto the front plate 38. The support arm 50 is pivotably disposed in the support bracket 40 in a manner as discussed above. Similarly, in yet another embodiment having features of the present invention, the support bracket 40 may be welded or bolted directly to a hoist member without employing a front plate 38. Also, rather than having separate top and bottom members, the support bracket 40 can alternatively be constructed of a single piece. In still further embodiments having features of the present invention, the support arm may be welded directly to a hoist member or secured by a mount body such as a bracket, plate or hinge welded to the hoist member. Also, a support body can be welded directly to the hoist 22.

The apparatus described in the above embodiments are preferably constructed of aluminum. However, other suitably strong metals, such as steel or even high tensile plastics, may be appropriate.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A method for temporarily retaining a vehicle wheel, comprising the steps of: elevating a vehicle on an automotive hoist so that a support arm disposed on the hoist is at about the same height as a wheel of the vehicle; removing the wheel from the vehicle; placing the wheel on the support arm; removing the wheel from the support arm substantially without bending over; and reinstalling the wheel onto the vehicle.

2. The method according to claim 1 wherein the support arm is pivotable relative to the hoist between open and closed positions, and further comprising the steps of pivoting the support arm to the open position prior to removing the wheel from the vehicle, and pivoting the support arm to the closed position after removing the wheel from the support arm.

3. The method according to claim 1 wherein the support arm is installed on a vertical support member of the hoist at a height about chest high to a person.

4. The method according to claim 1 wherein the support arm is installed on the hoist such that an individual removing the wheel from the vehicle does not have to bend significantly at the waist to guide the wheel over the hanger.

5. The method according to claim 1 wherein the support arm is installed on a vertical support member of the hoist in a manner so that the height of the support arm is adjustable, and further comprising the step of adjusting the height of the support arm to be about chest high to an individual executing the method prior to elevating the vehicle on the hoist.

* * * * *